March 26, 1957  F. H. GREEN  2,786,341

DIRECT EVAPORATIVE VORTEX TUBE REFRIGERATION SYSTEM

Filed June 19, 1950

FREDERICK H. GREEN,
INVENTOR.

BY

ATTORNEY

United States Patent Office 2,786,341
Patented Mar. 26, 1957

2,786,341

DIRECT EVAPORATIVE VORTEX TUBE REFRIGERATION SYSTEM

Frederick H. Green, Los Angeles, Calif., assignor to The Garrett Corporation, Los Angeles, Calif., a corporation of California Application June 19, 1950, Serial No. 169,025

22 Claims. (Cl. 62—138)

My invention relates in general to means for cooling a flow of gaseous fluid, and relates in particular to a simple system, employing no continuously moving mechanical parts, capable of producing a substantial reduction in the temperature of the air.

It is an object of the invention to provide a system of simple form and relatively light weight for cooling a flow of air and delivering the same under pressure to a space which is to receive the cooled air.

The invention is of especial utility in aircraft where it is necessary to deliver cooled air, under pressure, to a space such as a cabin occupied by people, a chamber having instruments therein or the interior of an electrical apparatus.

It is an object of the invention to provide a cooling system employing a vortex tube as one of its cooling elements, this cooling system having means for bringing the gaseous fluid, or air, into contact with a substance which, by its vaporization will effect a cooling of the gaseous medium or air.

A further object of the invention is to provide a simple means, having especial utility on aircraft, for supplying a cooled air flow under pressure, this system having parts arranged for cooling of compressed air taken from the outlet passage of a jet compressor, passing this air in heat exchange relation to a flow of coolant air obtained from a ram duct, cooling the air by spraying water thereinto, conducting the air and water through a vortex tube and separating at least a part of the water from the cooled air which is discharged from the cooled air outlet of the vortex tube, for delivery to the space which is to receive the cooled air.

Further objects and advantages of the invention will be brought out in the following part of the specification wherein I have described a simple form of the invention in complete detail for the purpose of making a full disclosure, without limiting the scope of the invention defined in the appended claims.

Referring to the drawing which is for illustrative purposes only:

Figure 1:
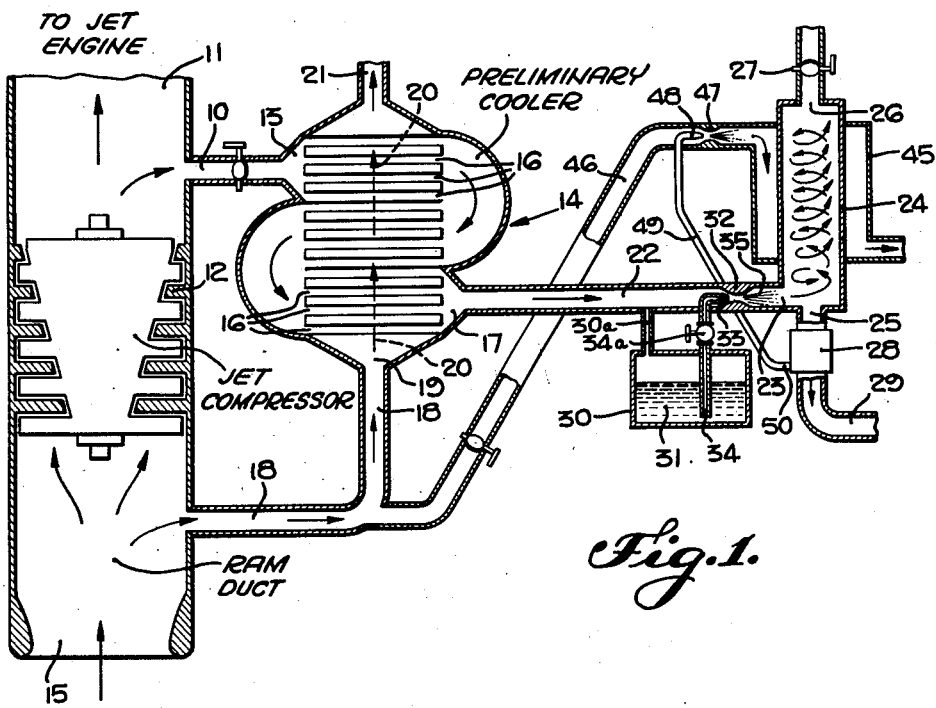
Fig. 1 is a schematic, partly sectioned viewed showing a preferred embodiment of my invention.

In the shown simple form of my invention, a hot compressed air supply duct 10 is arranged for connection to the outlet duct 11 of a jet compressor 12 such as employed in jet driven aircraft to supply compressed air to the jet engines.

The supply duct 10 leads to the inlet 13 of a preliminary cooler 14 comprising a heat exchanger for passing the hot compressed air from the duct 10 in heat exchange relation to a flow of coolant air obtained from the ram duct 15 through which ambient air is supplied to the jet compressor 12. The cooler or heat exchanger 14 is of the counterflow type having passages 16 for the compressed air leading from the inlet 13 to a compressed air outlet 17. The coolant air flows from the ram duct 15 through an air duct 18 to the coolant air inlet 19 of the cooler. The coolant air is conducted in heat transfer relation to the compressed air in the passages 16, as indicated by the arrows 20 and is discharged through the coolant outlet 21.

The partly cooled compressed air issuing from the compressed air outlet 17 of the heat exchanger 14 is carried through duct means 22 to the inlet 23 of a vortex tube 24 having a cooled air outlet 25 and a hot air outlet 26, the hot air outlet 26 having a valve 27 for regulating the flow therethrough or for closing off the flow through the hot air outlet 26, completely. A water separator 28 is connected to the cooled air outlet 25 of the vortex tube 24 and the outlet of this separator 28 is connected through a duct 29 with the space to receive the cooled air, for example a cabin, not shown. The supply duct 10, the compressed air passages 16 of the heat exchanger 14, the duct means 22, the interior of the vortex tube 24 and the parts 25, 28 and 29 define a path of flow for the compressed air from the source of compressed air 11 to the space which is to receive cooled air maintained under pressure.

In this preferred practice of the invention I provide means for bringing a vaporizable medium, into direct contact with the air flowing in the path of flow identified in the foregoing. This means comprises a source of supply of water shown as a tank 30 having a body of water 31 therein. A water injector 32, having a spray nozzle 33, is arranged to draw water from the tank 30 through piping 34 having a control valve 34a therein. When the air cooling system is in operation fine particles of water are sprayed into the air stream as schematically indicated at 35. At least part of the water thus sprayed into the air stream is vaporized, cooling the air which passes into the vortex tube 24. The action of the vortex tube is to further cool the air, with the result that air at reduced temperature issues from the cooled air outlet 25 of the vortex tube, and some of the vapor in the air issuing from the vortex tube 24 condenses to form water droplets in addition to those water droplets which form an unvaporized portion of the water spray 35. The separator 28 removes water in liquid form from the air flow traveling toward the duct 29. The proportion of water to be removed from the air flow prior to its passage through the duct 29 depends, of course, upon the character of the space in the aircraft into which the cooled compressed air is to be delivered.

Figure 2:
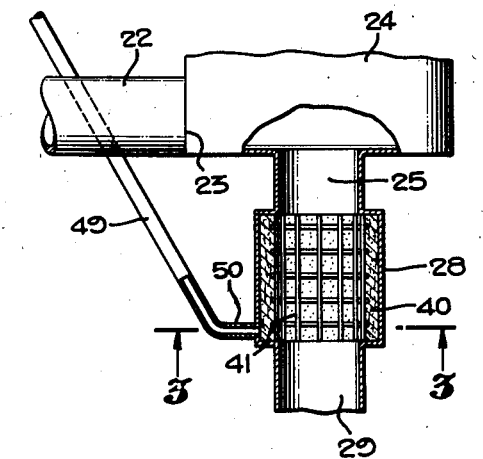
Fig. 2 is an enlarged, fragmentary partly sectioned view showing a form of water separator which may be used in the practice of the invention.
Figure 3:
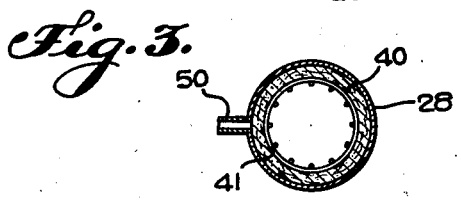
Fig. 3 is a cross section taken as indicated by the line 3—3 of Fig. 2.

As shown in Figs. 2 and 3, the water separator 28 has therein a cylindric wall 40 of fibrous material supported around the exterior of a tubular reticulate support 41 shown as a grid or screen. The cold air which leaves the vortex tube 24 through the outlet is in rotation around the axis of the outlet, carrying the water vapor and droplets radially outwardly so as to accumulate in the fibrous wall 40.

The water recovered by the separator 28 is brought into cooling relation to at least a portion of the external wall surface of the vortex tube 24. For this purpose I place a cooling chamber 45 around the tube 24. This chamber 45 is connected to a source of coolant air by a duct 46 which connects with the coolant air duct 18. In the duct 46 there is an aspirator 47 having a nozzle 48 which is connected through a pipe 49 with the outlet 50 of the water separator 28. Water recovered from the air stream cooled by the combined action of the water and of the vortex tube 24, is again used to assist in the cooling action by cooling a selected amount of the wall of the vortex tube 24. In the form of the invention shown the water is vaporized in the coolant air which flows in the cooling chamber 45, is cooled by vaporization, reduces the temperature of the coolant air; and also cools the wall of the vortex tube 24 by direct contact of unvaporized water particles with the exterior of the vortex tube.

I claim:

1. In a system for cooling a flow of gaseous fluid: preliminary cooling means for the gaseous fluid comprising a heat exchanger arranged to pass the gaseous fluid in heat exchange relation to other fluid; a vortex tube to receive the gaseous fluid and cool the same; means operative to add to said gaseous fluid, between said preliminary cooling means and said vortex tube, a substance which will vaporize and cool the gaseous fluid; and means connected to the outlet of said vortex tube adapted to remove at least a quantity of said substance from said flow of gaseous fluid.

2. In a system for cooling a flow of gaseous fluid: preliminary cooling means for the gaseous fluid comprising a heat exchanger arranged to pass the gaseous fluid in heat exchange relation to other fluid; a vortex tube to receive the gaseous fluid and cool the same; means operative to add to said gaseous fluid upstream from said vortex tube, a liquid which will vaporize at the temperature of the gaseous fluid and thereby cool the gaseous fluid; and means downstream from said vortex utbe adapted to remove liquid from said gaseous fluid.

3. In a system for cooling a flow of gaseous fluid: preliminary cooling means for the gaseous fluid comprising a heat exchanger arranged to pass the gaseous fluid in heat exchange relation to other fluid; a vortex tube to receive the gaseous fluid and cool the same; means operative to add to said gaseous fluid, between said preliminary cooling means and said vortex tube, a liquid which will vaporize at the temperature of the gaseous fluid and thereby cool the gaseous fluid; and a separator connected to the outlet of said vortex tube adapted to remove at least a portion of said liquid from said flow of gaseous fluid which has been cooled by said vortex tube.

4. In a system for cooling a flow of gaseous fluid derived from a source of gaseous fluid under pressure: a vortex tube arranged to receive the flow of gaseous fluid and cool the same; a cooler arranged in proximity to the exterior of said tube to cool the same; means downstream from said source operative to add to said flow of gaseous fluid, so that it will pass with the gaseous fluid into the interior of said vortex tube, a substance which will vaporize and cool the gaseous fluid; and means to remove at least a portion of said substance from said flow of gaseous fluid.

5. In a system for cooling a flow of gaseous fluid derived from a source of gaseous fluid under pressure: a vortex tube arranged to receive the flow of gaseous fluid and cool the same; means downstream from said source operative to add to said flow of gaseous fluid, so that it will pass with the gaseous fluid into the interior of said vortex tube, a liquid which will vaporize at the temperature of the gaseous fluid and thereby cool the gaseous fluid; and means adapted to remove said liquid from said gaseous fluid.

6. In a system for cooling a flow of gaseous fluid derived from a source of gaseous fluid under pressure: a vortex tube arranged to receive the flow of gaseous fluid and cool the same; means for cooling said vortex tube; means downstream from said source operative to add to said flow of gaseous fluid, up stream from said vortex tube, a substance which will vaporize and cool the gaseous fluid so that at least a portion of said substance will pass with the gaseous fluid into the vortex tube; and means to remove at least a portion of said substance from said flow of gaseous fluid.

7. In a system for cooling a flow of gaseous fluid derived from a source of said fluid under pressure: a vortex tube to receive the gaseous fluid and cool the same; means operative to add a cooling liquid substance to said gaseous fluid at a point between said source and the outlet of said vortex tube so that said substance will be circulated within said vortex tube; and a separator connected to the outlet of said vortex tube adapted to remove at least a portion of said liquid substance from said flow of gaseous fluid which has been cooled by said vortex tube.

8. In a system for use in aircraft having a jet compressor and a ram duct: a heat exchanger adapted to pass a flow of compressed air from said jet compressor in heat exchange relation to a flow of air obtained from said ram duct; means operating to add to the flow of cooled compressed air from the outlet of said heat exchanger a substance which will vaporize and cool said compressed air; a vortex tube arranged so that its inlet receives said compressed air and said substance, said vortex tube having an outlet for cooled air which may be connected to the place which is to receive the cooled air; and means for separating from the air which flows through the outlet of said vortex tube at least a part of said substance.

9. In a system for use in aircraft having a jet compressor: a heat exchanger adapted to pass a flow of compressed air from said jet compressor in heat exchange relation to other fluid; means operating to spray water into the flow of cooled compressed air from the outlet of said heat exchanger which will vaporize and cool said compressed air; a vortex tube arranged so that its inlet receives said compressed air and said water, said vortex tube having an outlet for cooled air which may be connected to the place which is to receive the cooled air; and means for separating water from the air which flows through the outlet of said vortex tube.

10. In a system for use in aircraft having a jet compressor and a ram duct: a heat exchanger adapted to pass a flow of compressed air from said jet compressor in heat exchange relation to a flow of air obtained from said ram duct; means operating to add to the flow of cooled compressed air from the outlet of said heat exchanger a substance which will vaporize and cool said compressed air; and a vortex tube arranged so that its inlet receives said compressed air and said substance, said vortex tube having an outlet for cooled air which may be connected to the place which is to receive the cooled air.

11. In a system for cooling a flow of gaseous fluid: preliminary cooling means for the gaseous fluid comprising a heat exchanger arranged to pass the gaseous fluid in heat exchange relation to other fluid; a vortex tube to receive the gaseous fluid and cool the same; means operative to add to said gaseous fluid, between said preliminary cooling means and said vortex tube, a substance which will vaporize and cool the gaseous fluid; means connected to the outlet of said vortex tube adapted to remove at least a quantity of said substance from said flow of gaseous fluid; and means adapted to use said quantity of said substance to cool said vortex tube.

12. In a system for cooling a flow of gaseous fluid: preliminary cooling means for the gaseous fluid comprising a heat exchanger arranged to pass the gaseous fluid in heat exchange relation to other fluid; a vortex tube to receive the gaseous fluid and cool the same; means operative to add to said gaseous fluid, between said preliminary cooling means and said vortex tube, a liquid which will vaporize at the temperature of the gaseous fluid and thereby cool the gaseous fluid; means adapted to remove liquid from said gaseous fluid; and means adapted to utilize said last named liquid to cool said vortex tube.

13. In a system for cooling a flow of gaseous fluid: a vortex tube to receive the gaseous fluid and cool the same; means operative to add to said gaseous fluid, up stream from said vortex tube, a liquid which will vaporize at the temperature of the gaseous fluid and thereby cool the gaseous fluid; a separator connected to the outlet of said vortex tube adapted to remove at least a portion of said liquid from said flow of gaseous fluid which has been cooled by said vortex tube; and means adapted to utilize said last named liquid to cool said vortex tube.

14. In a system for cooling a flow of gaseous fluid: preliminary cooling means for the gaseous fluid comprising a heat exchanger arranged to pass the gaseous fluid in heat exchange relation to other fluid; a vortex tube to receive the gaseous fluid and cool the same; means operative to add to said gaseous fluid, between said preliminary cooling means and said vortex tube, a liquid which will vaporize at the temperature of the gaseous fluid and thereby cool the gaseous fluid; means adapted to remove liquid from said gaseous fluid; and means adapted to apply vaporizable liquid and a gaseous fluid to the exterior of said vortex tube to cool the same.

15. In a system for cooling a flow of gaseous fluid: a vortex tube to receive the gaseous fluid and cool the same; means operative to add to said gaseous fluid a liquid which will vaporize at the temperature of the gaseous fluid and thereby cool the gaseous fluid; means adapted to remove liquid from said gaseous fluid; and means adapted to apply vaporizable liquid and a gaseous fluid to the exterior of said vortex tube to cool the same.

16. In a system for cooling a flow of gaseous fluid received from a source of said gaseous fluid: a vortex tube to receive the gaseous fluid and cool the same, said tube having at the front end thereof tangential inlet means for receiving the gaseous fluid from said source and an axial outlet for delivery of cooled gaseous fluid; means arranged to deliver a coolant substance to the interior of said tube so that it will act within the tube; cooling means connected to the exterior of said tube to cool the same; and a separator for said coolant substance connected to said outlet of said vortex tube.

17. In a system for cooling a flow of gaseous fluid received from a source of said gaseous fluid: a vortex tube to receive the gaseous fluid and cool the same, said tube having at the front end thereof inlet means for receiving the gaseous fluid from said source and also an outlet for delivery of cooled gaseous fluid; means arranged to deliver a coolant substance to the interior of said tube; a duct for carrying said gaseous fluid to a place of its utilization; and a separator for said coolant substance connected to said vortex tube so that said coolant substance will not pass to said place of utilization of the gaseous fluid.

18. In a system for cooling a flow of gaseous fluid received from a source of said gaseous fluid: a vortex tube to receive the gaseous fluid and cool the same, said tube having inlet means for receiving the gaseous fluid from said source and an outlet for delivery of cooled gaseous fluid; means arranged to deliver a coolant substance to the interior of said tube; and cooling means connected to the exterior of said tube to cool the same.

19. In a system for cooling a flow of gaseous fluid received from a source of said gaseous fluid; a vortex tube to receive the gaseous fluid and cool the same, said tube having inlet means for receiving the gaseous fluid from said source and an outlet for delivery of cooled gaseous fluid; a container for a coolant substance; and duct means for delivery of said coolant substance from said container to the interior of said vortex tube.

20. In a system for cooling a flow of gaseous fluid received from a source of said gaseous fluid: a vortex tube to receive the gaseous fluid and cool the same, said tube having inlet means for receiving the gaseous fluid from said source and an outlet for delivery of cooled gaseous fluid; a container for a liquid; and duct means for delivery of said liquid from said container to the interior of said vortex tube.

21. In a system for cooling a flow of gaseous fluid received from a source of said gaseous fluid: a vortex tube to receive the gaseous fluid and cool the same, said tube having inlet means for receiving the gaseous fluid from said source and an outlet for delivery of cooled gaseous fluid; means arranged to deliver a liquid to the interior of said tube; a separator for said liquid connected to said outlet of said vortex tube; and means to utilize liquid from said separator to cool the exterior of said vortex tube.

22. In a system for cooling a flow of air which moves from a source of said air under pressure to a place which is to receive the cooled air: a vortex tube having adjacent an end thereof a tangential inlet connected to said source of air under pressure and an axial cooled air outlet in said end thereof; and means for delivering a cooling liquid into the system at a point between said source of air under pressure and said outlet of said vortex tube so that said liquid will circulate in said tube and thereby enter into the cooling action which takes place in said tube.

References Cited in the file of this patent

UNITED STATES PATENTS

| | | |
|---|---|---|
| 1,812,339 | Horne et al. | June 30, 1931 |
| 1,952,281 | Ranque | Mar. 27, 1934 |
| 2,124,289 | Ericson | July 19, 1938 |
| 2,126,266 | Laird | Aug. 9, 1938 |
| 2,304,151 | Crawford | Dec. 8, 1942 |
| 2,477,931 | King | Aug. 2, 1949 |
| 2,485,590 | Green | Oct. 25, 1949 |
| 2,581,168 | Bramley | Jan. 1, 1952 |
| 2,586,002 | Carson et al. | Feb. 19, 1952 |